United States Patent [19]

Kondo et al.

[11] Patent Number: 4,727,829
[45] Date of Patent: Mar. 1, 1988

[54] INTAKE SYSTEM FOR INTERNAL COMBUSTION ENGINE

[75] Inventors: Takeo Kondo, Iwata; Tetsuji Yamazaki, Kakegawa; Keiichi Sugiyama, Shizuoka, all of Japan

[73] Assignee: Yamaha Hatsudoki Kabushiki Kaisha, Japan

[21] Appl. No.: 854,151

[22] Filed: Apr. 21, 1986

[30] Foreign Application Priority Data

Apr. 23, 1985 [JP] Japan ................................. 60-85354
Apr. 23, 1985 [JP] Japan ................................. 60-85355

[51] Int. Cl.$^4$ ............................................. F02B 27/02
[52] U.S. Cl. ............................................... 123/52 MB
[58] Field of Search ......... 123/52 M, 52 MB, 52 MC, 123/52 MV

[56] References Cited

U.S. PATENT DOCUMENTS

| 2,164,230 | 6/1939 | Cuddon-Fletcher | 123/52 M |
| 3,814,069 | 6/1974 | Croft et al. | 123/52 M |
| 4,565,166 | 1/1986 | Takeda | 123/52 MB |
| 4,641,610 | 2/1987 | Rutschmann | 123/52 MV |

FOREIGN PATENT DOCUMENTS

| 2029507 | 3/1980 | United Kingdom | 123/52 MB |
| 2117043 | 10/1983 | United Kingdom | 123/52 MB |
| 2135388 | 8/1984 | United Kingdom | 123/52 M |
| 2160264 | 12/1985 | United Kingdom | 123/52 M |

Primary Examiner—Craig R. Feinberg
Attorney, Agent, or Firm—Ernest A. Beutler

[57] ABSTRACT

Several embodiments of induction systems for an internal combustion engine wherein each cylinder is served by a pair of intake passages having significantly different lengths for tuning them for different engine running requirements. A throttle valve arrangement controls the flow through the intake passages and the selection of the appropriate length for a given running condition. Each intake passage is supplied with air from a respective plenum chamber and the plenum chambers are located at different locations within the engine compartment. In all embodiments, one plenum chamber is positioned adjacent the engine and in the embodiments, the other plenum chamber is positioned either at the end of the engine or at the opposite side. Both plenum chambers are supplied with filtered air from a common air cleaner.

14 Claims, 7 Drawing Figures

INTAKE SYSTEM FOR INTERNAL COMBUSTION ENGINE

BACKGROUND OF THE INVENTION

This invention relates to an intake system for an internal combustion engine and more particularly to an intake system that provides better performance throughout the entire engine speed and load ranges and which affords a nevertheless relatively compact configuration.

In the copending patent application of the same title, Ser. No. 845,576, filed Mar. 28, 1986, in the names of Manabu Kobayashi, Kazutoshi Suzuki and Takeo Kondo and assigned to the assignee of this application, there is disclosed an intake system for an internal combustion engine which can be tuned to satisfy a wider number of engine speed and load conditions than conventional systems. The system illustrated and described in that application embodies first and second different length intake passages which serve common intake ports of the engine. By employing different lengths, it is possible to tune each passage to serve different engine speed and load ranges. A throttle valve arrangement is provided for automatically controlling which length induction passage serves the engine cylinders at specific running conditions. Although this arrangement has a number of advantages, it requires two separate plenum chambers with separate air inlet devices. Thus, it is necessary to provide two separate air cleaners and silencing inlets for the individual arrangements. With modern motor vehicles wherein the engine compartment is already extremely compact and filled with equipment, it is difficult to provide such separate intake devices.

It is, therefore, a principal object of this invention to provide an improved and simplified intake system for an internal combustion engine. It is another object of this invention to provide an improved induction system for internal combustion engines that can be tuned to suit varying engine requirements and yet which still employs a common air inlet.

It is yet a further object of this invention to provide an improved induction system and engine layout for a motor vehicle.

SUMMARY OF THE INVENTION

A first feature of this invention is adapted to be embodied in an intake system for an internal combustion engine having a variable volume chamber, an inlet port serving the chamber and first and second intake passages serving the inlet port. The first and second intake passages have substantially different lengths so that they can be tuned to different running conditions. Throttle valve means selectively control the flow through the intake passages and a common air inlet is provided for both of the intake passages.

Another feature of the invention is adapted to be embodied in a motor vehicle having an engine compartment. An engine is positioned within the engine compartment with its cylinders transversely arrayed across the engine compartment. Each cylinder is served by a respective inlet port. First and second intake passages serve each of the inlet ports and the intake passages have different lengths. The first of the intake passages is served by a plenum chamber that is located at a first location within the engine compartment. The second intake passages are served by a second plenum chamber that is located at a different position within the engine compartment. The plenum chambers are, in turn, served from a common inlet device that is positioned at a still third location in the engine compartment.

DETAILED DESCRIPTION OF THE PREFERRED EMBODIMENTS

Figure 1:
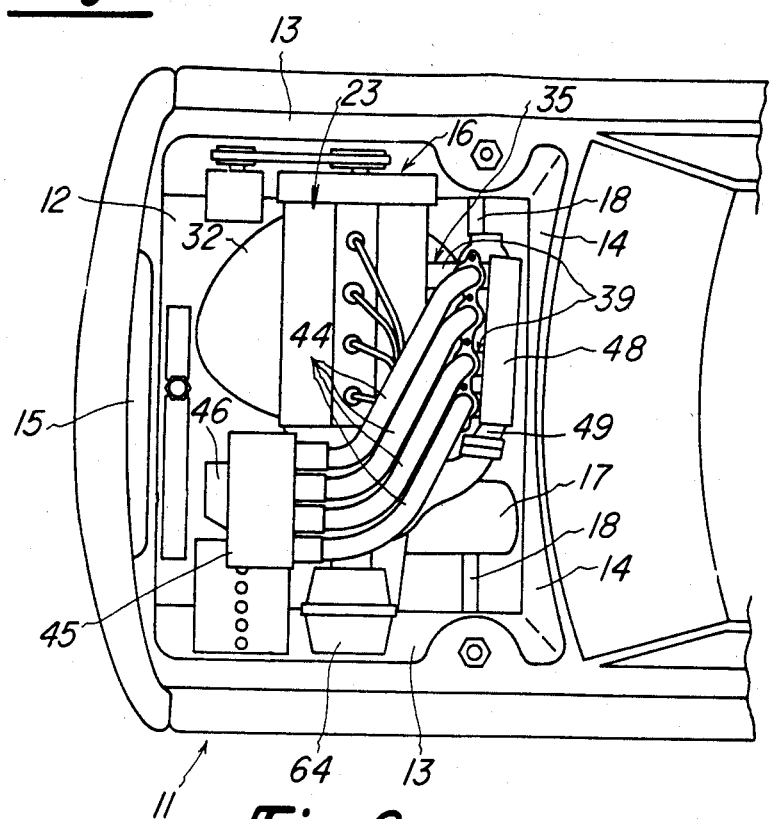
FIG. 1 is a top plan view of a portion of a motor vehicle with the hood removed and constructed in accordance with a first embodiment of the invention.
Figure 2:
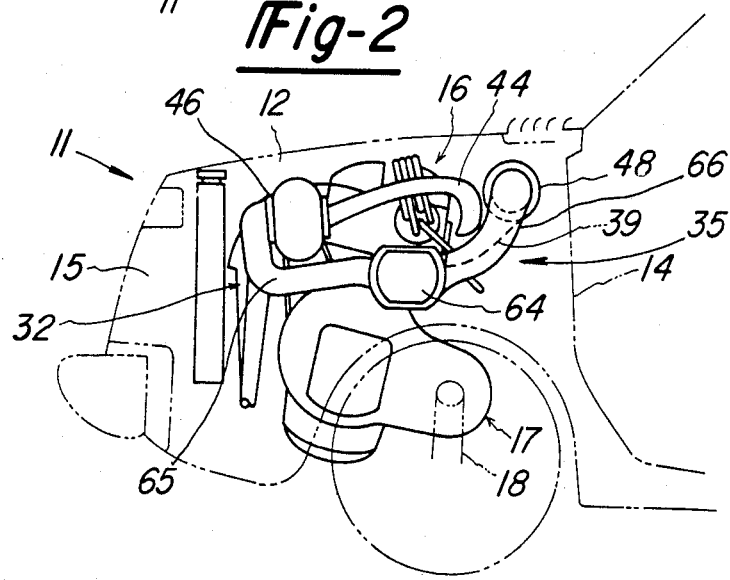
FIG. 2 is a side elevational view of the motor vehicle shown in FIG. 1 with portions of the vehicle shown in phantom.

Referring first to the embodiment of FIGS. 1 through 4 and initially to FIGS. 1 and 2 primarily, a motor vehicle powered by an internal combustion engine constructed in accordance with this embodiment is identified generally by the reference numeral 11. The motor vehicle 11 has a body which forms an engine compartment 12 that is defined at least in part by fender aprons 13 and a fire wall 14. An air inlet 15 is provided for admitting air into the engine compartment 12 through a grill opening (not shown). The engine compartment 12 is closed by a hood which has been removed in FIG. 1 to show the construction.

An internal combustion engine constructed in accordance with this embodiment of the invention is identified generally by the reference numeral 16 and is positioned within the engine compartment 12. The engine 16 is, in the illustrated embodiment, of the four cylinder inline type. It is to be understood, however, that the invention may be practiced with engines having other numbers of cylinders and other types of cylinder configurations.

In the illustrated embodiment, the vehicle 11 is of the transverse engine, front wheel drive type and, to that end, the engine 16 is mounted in the engine compartment 12 with its output shaft extending transversely to the longitudinal axis of the vehicle 11. The engine 16 drives a transmission mechanism and transfer drive 17 which, in turn, drives an integral differential for powering a pair of front axle shafts 18 that drive the front wheels in a known manner. The overall configuration of the front wheel drive arrangement is believed to be well known in this art and, for that reason, further discussion of it is believed to be unnecessary.

Figure 3:
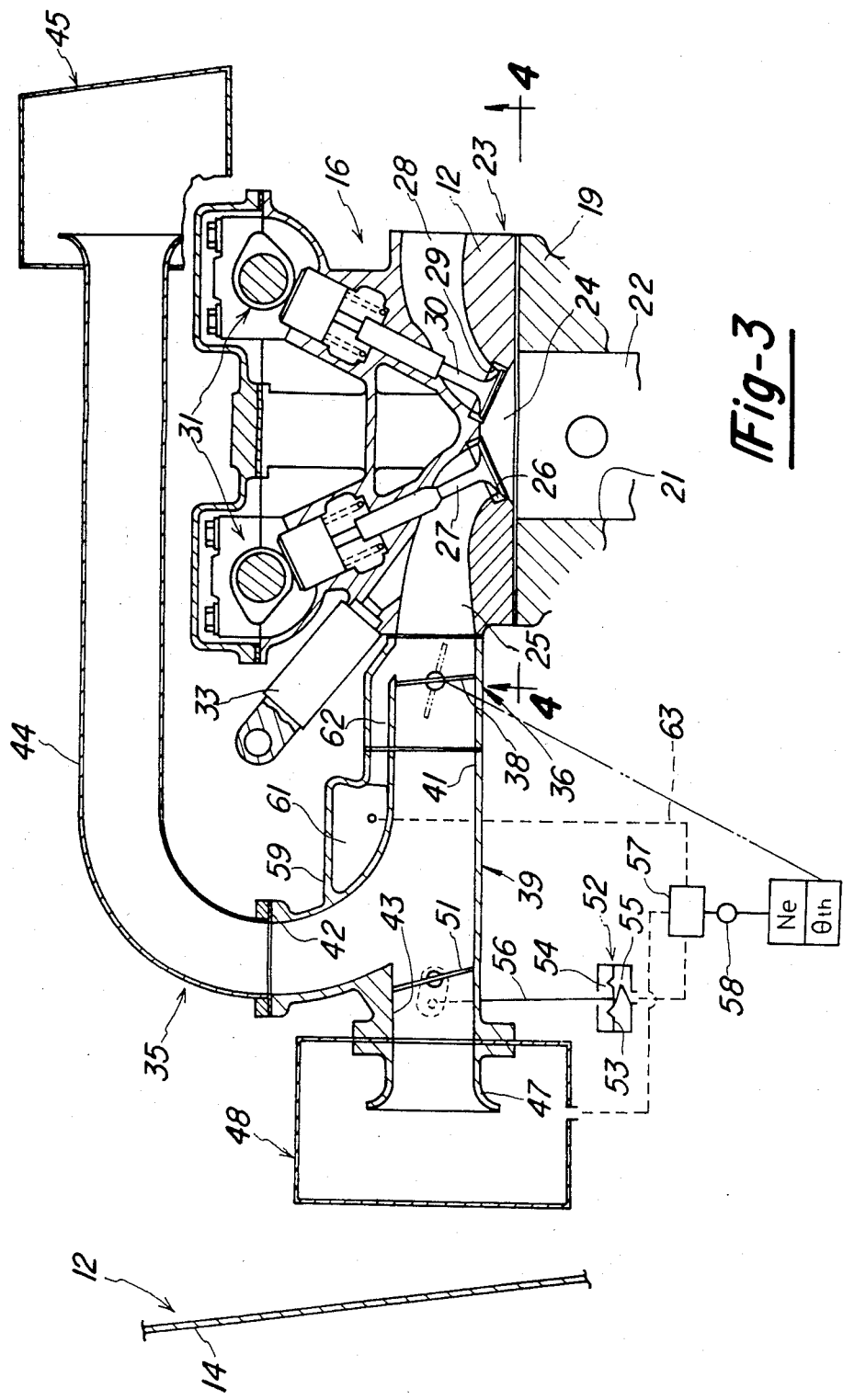
FIG. 3 is a cross-sectional view, taken along a vertical plane, showing a portion of the engine and engine compartment of this embodiment.
Figure 4:
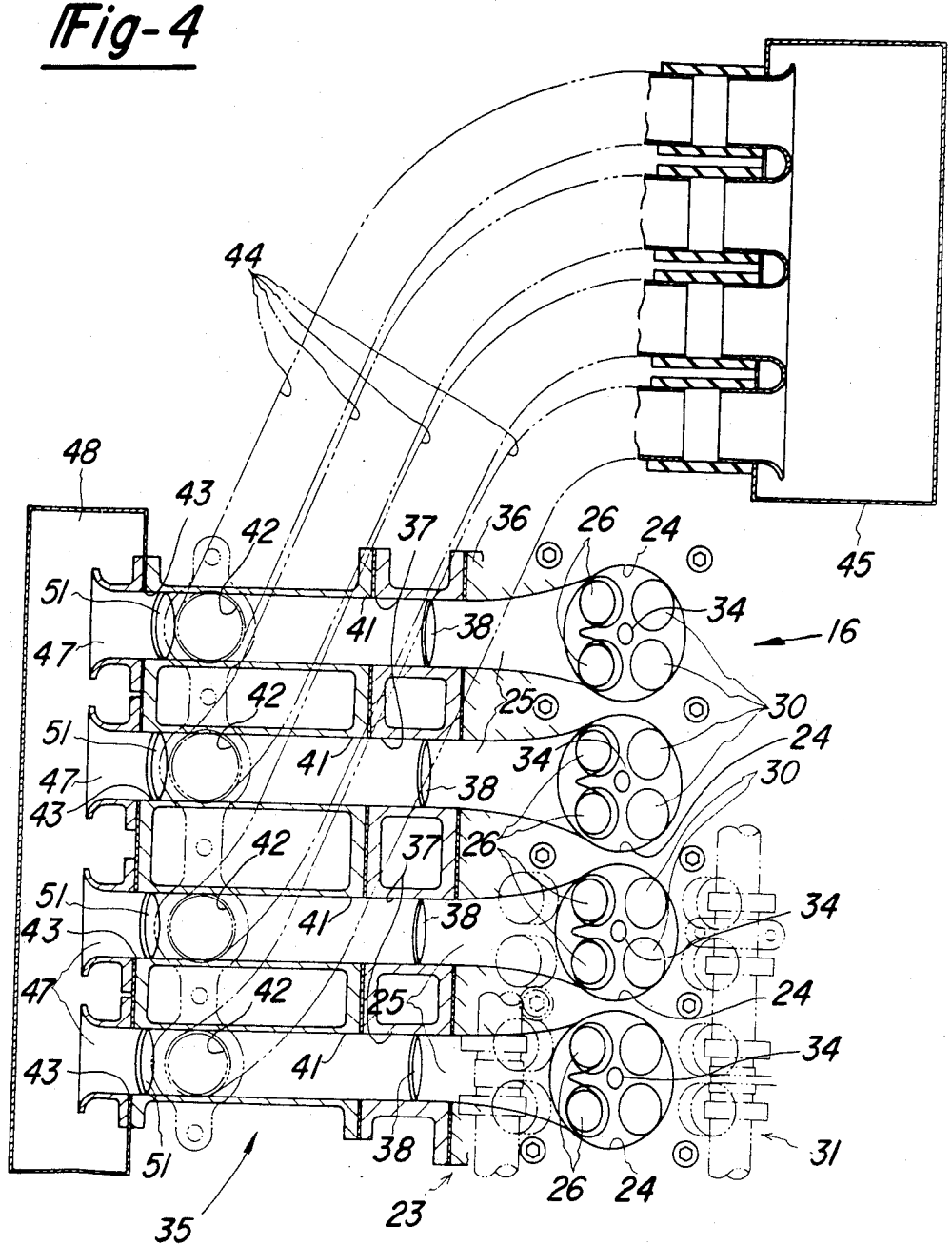
FIG. 4 is a view taken along the line 4—4 of FIG. 3 and shows the general configuration of the induction system.

Referring now additionally to FIGS. 3 and 4 and primarily to these figures, the construction of the engine 16 will be described. The engine 16 includes a cylinder block 19 in which cylinder bores 21 are formed. Pistons 22 are supported for reciprocation within the cylinder bores 21 and drive a crankshaft (not shown) in a known manner, by means of connecting rods. Since the invention is directed to the induction system for the engine 16, the details of the engine which do not relate to the induction system will be described only generally and may be considered to be conventional.

A cylinder head 23 is affixed to the cylinder block 19 in a known manner. The cylinder head 23 has individual recesses or cavities 24 that cooperate with the head of the piston 21 and the cylinder bores 22 to provide variable volume chambers. The volume of the chambers varies during the reciprocation of the pistons 22 and, at times, the cavities 24 will be referred to as combustion chambers.

Intake passages 25 extend through one side of the cylinder head 16 and terminate at a pair of intake ports 26 that cooperate with each of the chambers 24. The passages 25 are siamesed. That is, one passage 25 cooperates with a pair of intake ports 26 for each respective cylinder. Intake valves 27 are slidably supported by the cylinder head assembly 23 in a known manner and cooperate with the intake ports 26 for controlling the flow through them.

In a similar manner, exhaust passages 28 extend through the opposite side of the cylinder head and each terminate in a pair of exhaust ports 29. Exhaust valves 30 are slidably supported within the cylinder head 23 and control the flow through the exhaust ports 29. The intake valves 27 and exhaust valves 30 are operated in a suitable manner, as by means of a pair of overhead mounted camshafts 31. The exhaust ports 29 and exhaust passages 28 discharge the exhaust gases to an exhaust manifold 32 that is positioned on the forward side of the engine 16 as it lies within the engine compartment 12 (FIGS. 1 and 3).

A fuel injection nozzle 33 is supported in the cylinder head 23 in proximity to each of the intake passages 25 for discharging fuel into the intake passage 25 upstream of the intake ports 26 to form a fuel/air charge that is delivered through the intake valves 27 into the chamber 24. This charge is fired by means of a spark plug 34 which is generally centrally positioned and then the burnt charge is discharged to the atmosphere through an exhaust system which includes the exhaust passages 28 and exhaust manifold 32.

As thus far described, the construction of the engine 16 may be considered to be conventional and, for that reason, the basic components of the engine have not been described in great detail. In accordance with the invention, an induction system, indicated generally by the reference numeral 35, is provided for delivering a tuned air charge to the cylinder head intake passages 25 so as to improve the running of the engine throughout its entire speed and load ranges. This induction system includes a valve block, indicated generally by the reference numeral 36, which is affixed to the cylinder head 23 and specifically its intake side. The valve block 36 has a plurality of intake passages 37 which register, respectively, with the cylinder head intake passages 25. Throttle valves 38 are positioned in each of the intake passages 37 for controlling the flow therethrough. The throttle valves 38 are all affixed to a common throttle valve shaft and are operated in unison by means of an accelerator linkage (not shown) that is connected to the accelerator pedal positioned in the passenger compartment of the vehicle 11.

An intake manifold 39 is affixed to the valve block 36. The intake manifold 39 has individual runners that terminate in outlets 41 that communicate with the valve block passages 37. Each outlet 41 is served by a first inlet 42 and a second inlet 43. The inlet 43 is generally aligned with the outlet 41 on a horizontal plane while the inlet 42 extends generally perpendicularly to the outlet 41.

Each inlet 42 cooperates with a respective long intake passageway that is formed by a manifold extension 44 which is affixed to the manifold 39. The passges 44 all emanate from a first plenum chamber 45. The first plenum chamber 45 is located remotely from the engine within the engine compartment 12 as shown in FIGS. 1 and 2 so that the passages 44 may have sufficient length to permit tuning for good performance at low engine speeds. Also, the passages 44 open into the plenum chamber 45 in the same longitudinal relation as the inlet openings 42 are located so that the passages 44 each have the same length. The plenum chamber 45 has a suitable air inlet opening 46 so as to permit atmoshperic air to be drawn into the plenum chamber 45, in a manner to be described, for distribution to the intake passages 44.

The inlet openings 43 are served by relatively short trumpets 47 that are all contained within a second plenum chamber 48. The second plenum chamber 48 is positioned close to the inlet side of the engine 16 and adjacent the fire wall 14 (FIGS. 1 and 2). As a result, the intake passageways serving the inlet openings 43 are very short and may be tuned for good high speed performance. The second plenum chamber 48 is provided with an air inlet 49 so as to permit the plenum chamber 48 to be recharged.

Throttle valves 51 are positioned in each of the inlet openings 43 for controlling their communication with the engine induction system. The throttle valves 51 are all connected to a common throttle valve shaft that is operated by a vacuum servo motor, indicated generally by the reference numeral 52 (FIG. 3). The vacuum servo motor 52 has a diaphragm 53 that divides it into an atmospheric chamber 54 and a control chamber 55. The diaphragm 53 is connected by means of a linkage system, indicated schematically at 56 to the throttle valves 51 for operating them.

The control chamber 53 selectively receives either atmospheric pressure from the plenum chamber 48 or a vacuum signal, from a source to be described, under the control of a valve 57 which is, in turn, operated by a computer 58. In the illustrated embodiment, the computer 58 sends a signal to the valve 57 that is responsive to engine speed (Ne) and position of the throttle valves 38 θth. It is to be understood, however, that other signals may be utilized to control the opening of the throttle valves 51.

When the valve 57 is in a position that atmospheric pressure is present in the control chamber 55, the throttle valves 51 will be closed. However, when the atmospheric source is discontinued and the vacuum source initiated by the valve 57, the diaphragm 53 will be deflected so as to open the throttle valves 51.

The manifold 39 is provided with a section 59 that forms a transversely extending balance passage 61. The passage 61 extends transversely across the manifold 39 and communicates with the valve body passages 37 downstream of the throttle valves 38 through balance passage openings 62. A pressure tap, indicated by the line 63, extends from the balance passage 61 to the valve 57 to provide the vacuum source for this valve as aforedescribed.

It should be noted from FIGS. 1 and 2 that the plenum chambers 45 and 48 are positioned at different locations within the engine compartment 12. This allows the different length tuning of the intake passages and also permits the selection of a sufficient volume for each plenum chamber 45 and 48 to serve the running condition for which it and the associated intake passages are tuned. Also, this permits the provision of sufficient volume without encroaching on the other components within the engine compartment.

In accordance with the invention, a single inlet device, indicated generally by the reference numeral 64, and in the form of an air cleaner and air silencer is provided for both of the plenum chambers 45 and 48. The air cleaner 64 is also located at a third location within the engine compartment 12 and has a suitable air inlet. A first conduit 65 interconnects an outlet of the air cleaner 64 with the inlet 46 of the plenum chamber 45. In a similar manner, a second conduit 66 connects an outlet of the air cleaner 64 with the plenum chamber inlet 49. In this way, a single air inlet source serves both of the plenum chambers 45 and 48.

The engine 16 operates as follows. When the engine is idling, the throttle valves 38 will be substantially fully closed as will the throttle valves 51. The intake charge is, therefore, primarily delivered to the individual cylinder head intake passages 25 from the balance passage openings 62 and balance passage 61. It should be noted that the cylinders fire alternately and, hence, only one cylinder will be undergoing an intake cycle at a given time. Therefore, the intake charge for each cylinder may be drawn from the portion of the remaining cylinders downstream of the throttle valves 38, upstream of the intake valves 27 and in the balance passageways. This insures a relatively high velocity of air flow so as to insure good turbulence and rapid flame propagation at low speeds.

As the throttle valves 38 progressively open, the intake charge will be drawn more primarily through the inlet opening 42 and passages 44 from the plenum chamber 45. Due to the long length of the intake passages 44, there will be good tuning so as to provide good performance at these low engine speeds. At the same time, the device will offer good intake silencing.

As the speed of the engine increases and the opening of the throttle valves 38 increases, eventually the computer 58 will activate the valve 57 so as to open the throttle valves 51. When this occurs, the intake charge will be drawn primarily from the plenum chamber 48 and intake openings 43. This is because these passages are shorter and offer less flow resistance so that a shorter effective intake length is provided that will be tuned to provide greater performance at the high end of the engine speed. Thus, it should be readily apparent that the device operates to increase power throughout the entire speed and load ranges.

Figure 5:
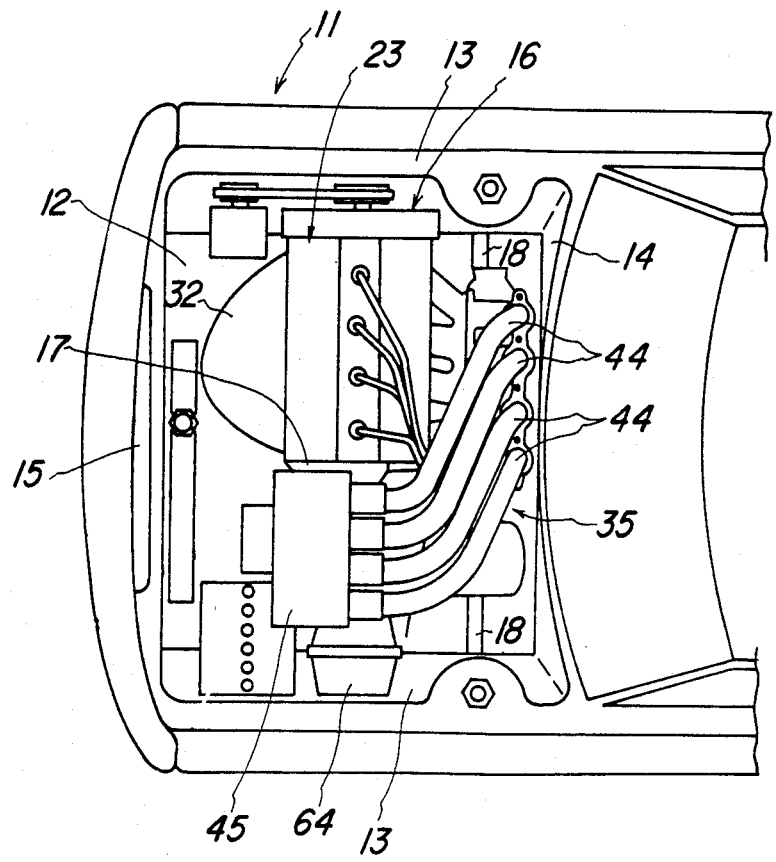
FIG. 5 is a top plan view of a portion of a motor vehicle, in part similar to FIG. 1, showing a second embodiment of the invention.

FIG. 5 illustrates another embodiment of the invention which is generally similar to the embodiment of FIGS. 1 through 4. Because of the similarity of the embodiments of FIGS. 1 through 4 with the embodiment of FIG. 5, those components which are the same have been identified by the same reference numeral and will not be described again in detail. In addition, since the manifolding and throttle valve arrangement for the embodiment of FIG. 5 is generally similar to the embodiment of FIGS. 1 through 4, this arrangement will not be shown again in detail and reference may be had to FIGS. 3 and 4 as to how this embodiment operates.

In this embodiment, the second inlet 42 for the manifold section 39 is formed in the body of the plenum chamber 48 rather than in the manifold 39 itself. Also, the throttle valves 51 are positioned within the plenum chamber 48 so that they will still only control the flow through the inlets 43. In all other regards, this embodiment is the same as the embodiment of FIGS. 1 through 4 and, for that reason, further description of this embodiment is believed to be unnecessary.

Figure 6:
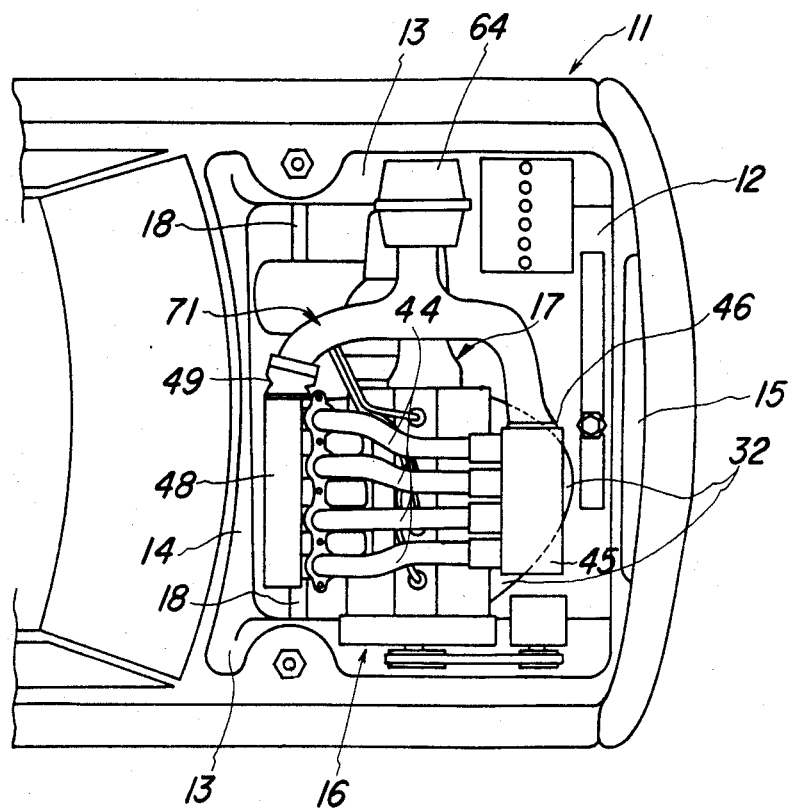
FIG. 6 is a top plan view of a portion of a motor vehicle, in part similar to FIGS. 1 and 5, showing a third embodiment of the invention.

In the embodiments thus far described, the first plenum chamber 45 was positioned remotely from and at one end of the engine 23 while the second plenum chamber 48 was positioned adjacent the inlet side of the engine 16. FIG. 6 shows another embodiment wherein the plenum chamber 45 is positioned on the exhaust side of the engine 16 so that the runners 44 extend across the engine rather than to one end of it. In this embodiment, the common inlet device 64, in the form of an air cleaner, communicates with the plenum chamber inlets 46 and 49 by means of a Y pipe, indicated generally by the reference numeral 71. In all other regards, this embodiment is the same as the previously described embodiments and, for that reason, further description of it is believed to be unnecessary.

Figure 7:
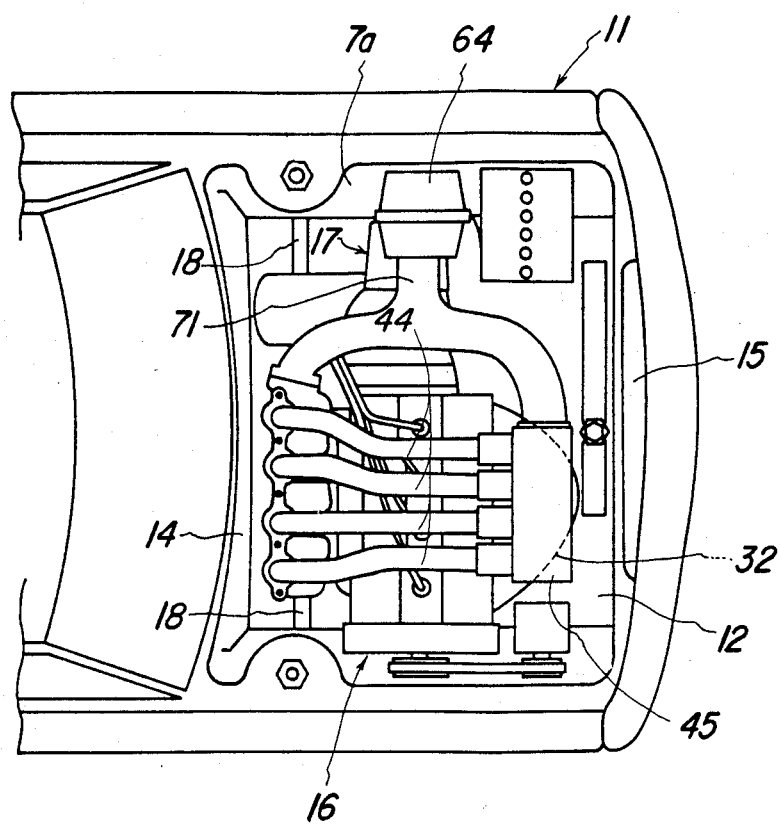
FIG. 7 is a top plan view, in part similar to FIGS. 1, 5 and 6, showing a fourth embodiment of the invention.

FIG. 7 shows an embodiment wherein the plenum chambers 45 and 48 are placed like the plenum chambers of the embodiment of FIG. 6 and a Y type pipe connects the air cleaner 64 with these two plenum chambers. However, this embodiment has the same relationship to FIG. 6 as the embodiment of FIG. 5 does to the embodiment of FIGS. 1 through 4. That is, the conduits 44 communicate with inlets formed in the plenum chamber 48 rather than in the manifold section. In all other regards, this embodiment is as the previously described embodiments and because of the relationship thereto, further description of this embodiment is believed to be unnecessary.

It should be readily apparent, therefore, that the described embodiments of this invention provide an extremely improved engine performance throughout the entire engine speed and load ranges since the induction system need not be tuned to favor a specific and compromise condition but rather can be tuned so as to suit both high and low speed running. In each embodiment of the invention illustrated and described, the plenum chambers associated with each branch of the induction system are disposed at spaced locations from each other in the engine compartment so that they can have the necessary volume. In addition, a single inlet device in the form of an air cleaner supplies air to both plenum chambers. Although several embodiments of the invention have been illustrated and described, various changes and modifications may be made without departing from the spirit and scope of the invention, as defined by the appended claims.

We claim:

1. An intake system for an internal combustion engine having a cylinder head defining in part a variable volume chamber, an inlet port extending from an inlet opening in one side of said cylinder head and serving said chamber, a first intake passage affixed to said one side of said cylinder head and serving said inlet port opening, said first intake passage extending outwardly of said one side of said cylinder head and forming an extension of said inlet port, a second intake passage serving said inlet port, said second intake passage having a first U shaped section communicating at one end with said first intake passage and communicating at its other end with a generally straight section extending across said cylinder head and terminating at an opposite side of said cylinder head, said second intake passage having a substantially greater length than said first intake passage, throttle valve means for selectively controlling the flow through said intake passages, and a common inlet device for supplying air to both of said intake passages.

2. An intake system as set forth in claim 1 wherein the common inlet device comprises an air cleaner.

3. An intake system as set forth in claim 1 wherein the throttle valve means controls the flow through one of the intake passages.

4. An intake system as set forth in claim 1 further including manually operated throttle valve means for controlling the flow through both of said intake passages.

5. An intake system as set forth in claim 4 wherein the first and said second intake passages having a common portion in which said manually operated throttle valve means is positioned.

6. An intake system as set forth in claim 1 wherein the cylinder head has multiple variable volume chambers each served by inlet ports and first and second intake passages.

7. An intake system as set forth in claim 6 further including balance passage means interconnecting the inlet ports of the cylinders with each other.

8. An intake system as set forth in claim 7 wherein the first and second intake passages have a common portion in which manually positioned throttle valves are provided.

9. An intake system as set forth in claim 8 wherein the balance passage means communicates with the common portion downstream of the throttle valve means.

10. An intake system as set forth in claim 1 further including a first plenum chamber serving the first intake passage and a second plenum chamber serving the second intake passage.

11. An intake system as set forth in claim 10 wherein the first and second plenum chambers receive air from the common inlet device.

12. An intake system as set forth in claim 11 wherein the common inlet device comprises an air cleaner.

13. An intake system as set forth in claim 11 wherein air flows from one of the plenum chambers through one of the intake passages to the variable volume chamber through the other of the plenum chambers.

14. An intake system as set forth in claim 13 wherein air flows to the first intake passage from the first plenum chamber and to the variable volume chamber through the second plenum chamber.

* * * * *